(12) United States Patent
Kim et al.

(10) Patent No.: US 9,519,387 B2
(45) Date of Patent: Dec. 13, 2016

(54) DISPLAY DEVICE INCLUDING CONDUCTIVE LAYER AND TOUCH SENSORS CONFIGURED TO RECEIVE THE SAME SIGNAL

(71) Applicant: Samsung Display Co., Ltd., Yongin (KR)

(72) Inventors: Chul Kim, Hwaseong-si (KR); Ho Kyoon Kwon, Seoul (KR); Jin Woo Park, Cheonan-si (KR); Dae Ho Song, Wanju-gun (KR); Ki Seok Cha, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1 day.

(21) Appl. No.: 14/222,339

(22) Filed: Mar. 21, 2014

(65) Prior Publication Data
US 2015/0097802 A1     Apr. 9, 2015

(30) Foreign Application Priority Data
Oct. 4, 2013  (KR) .......................... 10-2013-0118785

(51) Int. Cl.
*G06F 3/044* (2006.01)

(52) U.S. Cl.
CPC ..... *G06F 3/044* (2013.01); *G06F 2203/04103* (2013.01); *G06F 2203/04111* (2013.01)

(58) Field of Classification Search
CPC ........ G06F 3/044; G06F 3/041; G06F 4/0412; G06F 3/0412
See application file for complete search history.

(56) References Cited

U.S. PATENT DOCUMENTS 7,663,607 B2    2/2010   Hotelling et al.
7,812,827 B2   10/2010   Hotelling et al.
(Continued)

FOREIGN PATENT DOCUMENTS

KR       10-1085089       11/2011
KR    10-2013-0035243      4/2013

OTHER PUBLICATIONS

Yasuhiro Sugita, et al., "In-Cell Projected Touch Panel Technology," International Display Workshop, Dec. 4, 2012, pp. 825-828, Nara, Japan.

*Primary Examiner* — Larry Sternbane
*Assistant Examiner* — Sepehr Azari
(74) *Attorney, Agent, or Firm* — H.C. Park & Associates, PLC

(57) ABSTRACT

A display device includes a display panel, a signal controller, sensing signal lines, and a touch sensor controller. The display panel includes pixels configured to display images, and touch sensor electrodes configured to sense a touch event. The touch sensor electrodes overlap a conductive layer. The signal controller is configured to generate signals to control the display of the images via the display panel. The sensing signal lines are respectively connected to the touch sensor electrodes. The touch sensor controller is configured to transmit a sensing input signal via the sensing signal lines, receive a sensing output signal via the sensing signal lines, and generate touch information based on reception of the sensing output signal. The touch sensor controller is configured to apply the same signal to the touch sensor electrodes and the conductive layer.

13 Claims, 23 Drawing Sheets

(56) References Cited

U.S. PATENT DOCUMENTS

| | | |
|---|---|---|
| 7,995,041 B2 | 8/2011 | Chang |
| 8,363,027 B2 | 1/2013 | Hotelling et al. |
| 2010/0001973 A1 | 1/2010 | Hotelling et al. |
| 2010/0283760 A1* | 11/2010 | Leung et al. ............... 245/174 |
| 2010/0328239 A1* | 12/2010 | Harada ............... G06F 3/0412 |
| | | 345/173 |
| 2012/0105337 A1 | 5/2012 | Jun et al. |
| 2012/0206403 A1* | 8/2012 | Wang et al. ............... 345/174 |
| 2012/0218199 A1* | 8/2012 | Kim et al. ............... 345/173 |
| 2012/0249444 A1 | 10/2012 | Lee et al. |
| 2012/0274603 A1 | 11/2012 | Kim et al. |
| 2012/0327026 A1* | 12/2012 | Lee et al. ............... 345/174 |
| 2013/0044074 A1 | 2/2013 | Park et al. |
| 2013/0176251 A1* | 7/2013 | Wyatt et al. ............... 345/173 |

\* cited by examiner

DISPLAY DEVICE INCLUDING CONDUCTIVE LAYER AND TOUCH SENSORS CONFIGURED TO RECEIVE THE SAME SIGNAL

CROSS-REFERENCE TO RELATED APPLICATION

This application claims priority from and the benefit of Korean Patent Application No. 10-2013-0118785, filed on Oct. 4, 2013, which is incorporated by reference for all purposes as if set forth herein.

BACKGROUND

Field

Exemplary embodiments relate to a display device including touch sensors.

Discussion

A flat panel display (FPD), such as a liquid crystal display (LCD), an organic light emitting diode (OLED) display, an electrophoretic display (EPD), and the like, typically includes a field generating electrode and an electro-optical active layer. As the electro-optical active layer, a liquid crystal display may include a liquid crystal layer, an organic light emitting diode display may include an organic emission layer, and an electrophoretic display may include charged particles. The field generating electrode is usually connected to a switching element, such as a thin film transistor, to receive a data signal, and the electro-optical active layer typically converts the data signal to an optical signal to display an image.

Conventional flat panel displays may also include a touch sensing function in which user interactions may be detected, in addition to a function of displaying an image. The touch sensing function typically includes determining touch information, such as whether an object touches a screen and a touch location thereof, by sensing changes in pressure, charges, light, and/or the like, which are applied to the screen when a user touches the screen with a finger, a touch pen, or any other suitable interaction tool. The display device may receive an image signal based on the touch information.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device including touch sensors having advantages of minimizing (or at least reducing) an effect of a parasitic capacitance.

Exemplary embodiments also provide a display device including touch sensors having relatively excellent signal sensitivity performance.

Additional aspects will be set forth in the detailed description which follows, and, in part, will be apparent from the disclosure, or may be learned by practice of the inventive concept.

According to exemplary embodiments, a display device includes a display panel, a signal controller, sensing signal lines, and a touch sensor controller. The display panel includes pixels configured to display images, and touch sensor electrodes configured to sense a touch event. The touch sensor electrodes overlap a conductive layer. The signal controller is configured to generate signals to control the display of the images via the display panel. The sensing signal lines are respectively connected to the touch sensor electrodes. The touch sensor controller is configured to transmit a sensing input signal via the sensing signal lines, receive a sensing output signal via the sensing signal lines, and generate touch information based on reception of the sensing output signal. The touch sensor controller is configured to apply the same signal to the touch sensor electrodes and the conductive layer.

According to exemplary embodiments, a touch sensor may have improved resistance-capacitance (RC) loading because a noise coupling effect may not be generated (or at least reduced) by removing (or reducing) a parasitic capacitance. Further, the touch sensor may have relatively excellent signal sensitivity, which may help ensure a relatively high report (or detection) rate by using a self-capacitance method.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
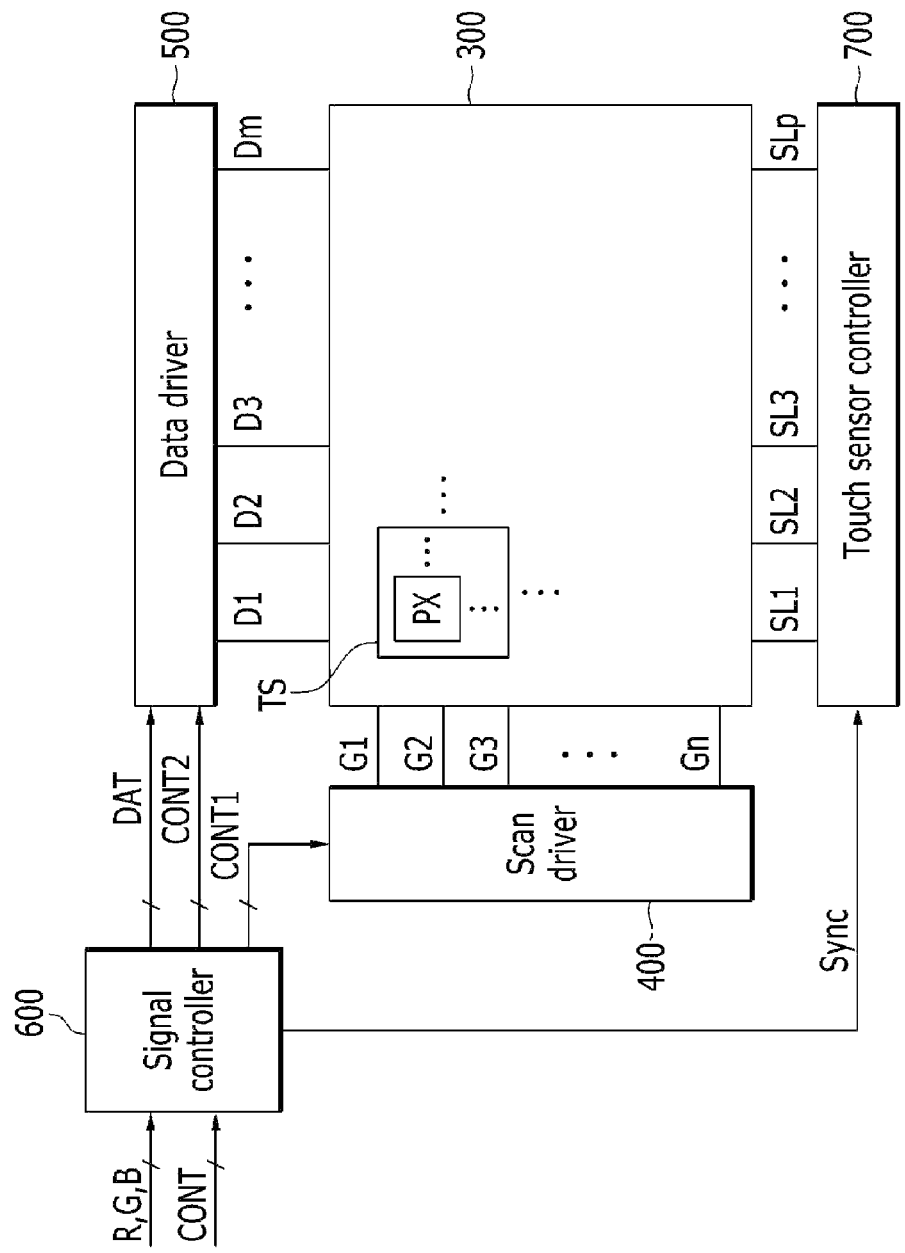
FIG. 1 is a layout view of a display device including touch sensors, according exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
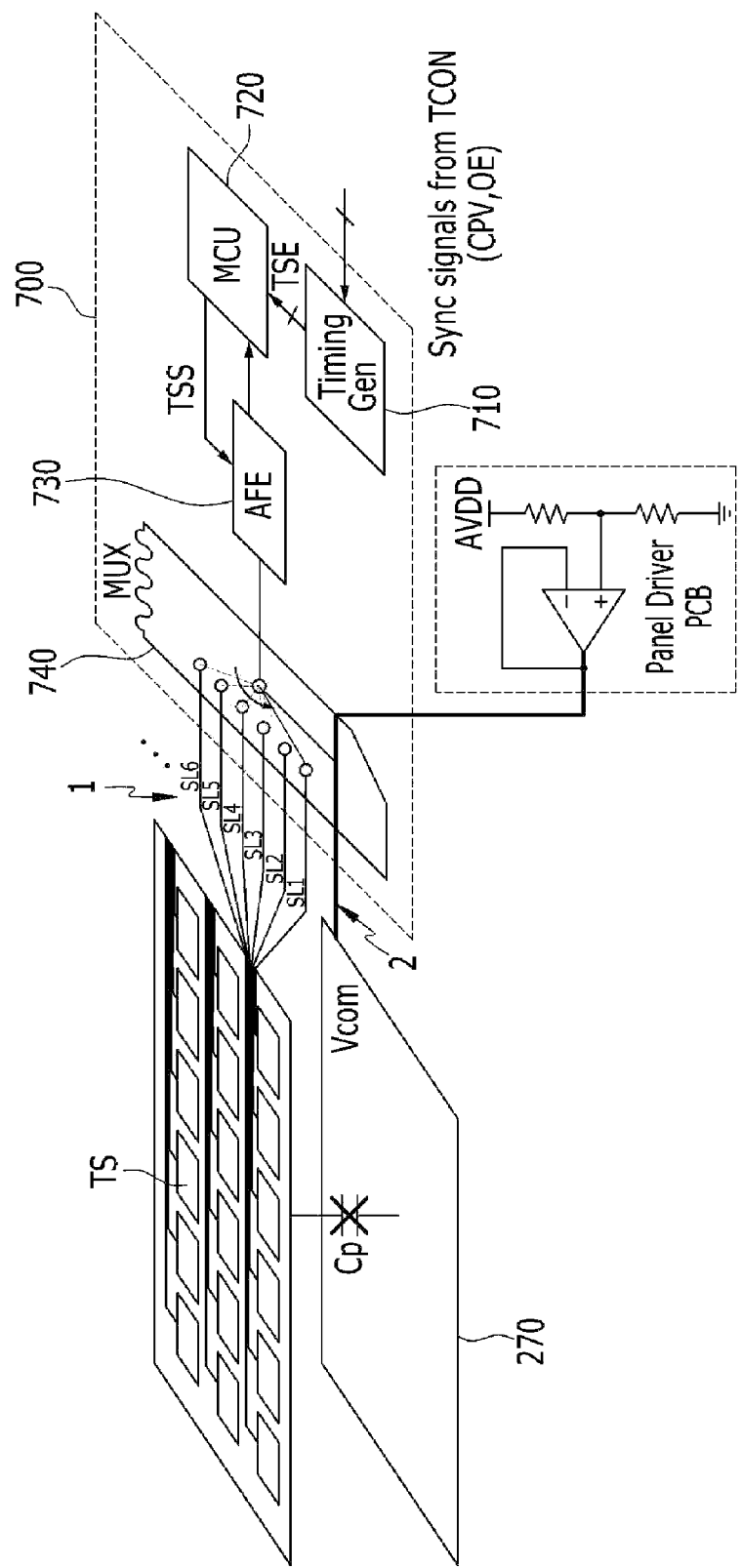
FIG. 2 is a schematic circuit diagram of the touch sensors and a driver of the display device of FIG. 1, according to exemplary embodiments.
Figure 3:
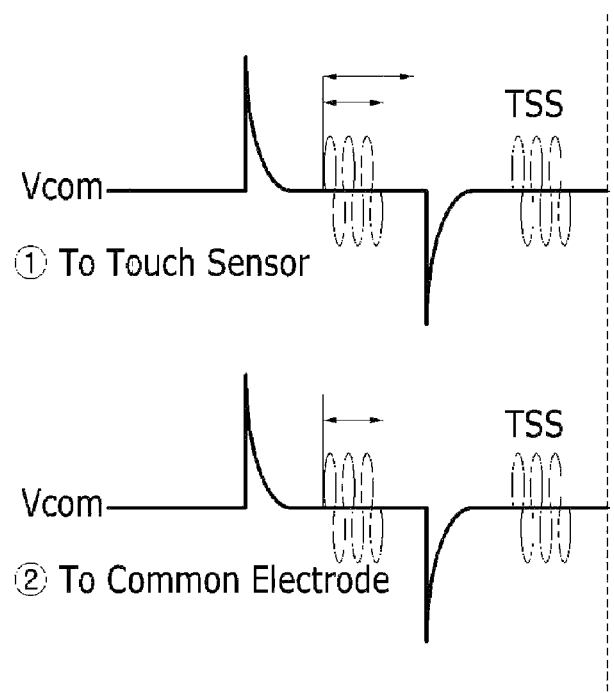
FIG. 3 is a waveform diagram illustrating a signal applied to the touch sensors of FIG. 2, according to exemplary embodiments.

FIG. 1 is a layout view of a display device including touch sensors, according to exemplary embodiments. FIG. 2 is a schematic circuit diagram of the touch sensors and a driver of the display device of FIG. 1, according to exemplary embodiments. FIG. 3 is a waveform diagram illustrating a signal applied to the touch sensors of FIG. 2, according to exemplary embodiments.

Referring to FIG. 1, a display device may include a display panel 300, as well as a scan driver 400, a data driver 500, and a touch sensor controller 700, each of which are connected to the display panel 300. The display device may also include a signal controller 600 to control the scan driver 400, the data driver 500, and the touch sensor controller 700. Although specific reference will be made to this particular implementation, it is also contemplated that the display device may embody many forms and include multiple and/or alternative components. For example, it is contemplated that the components of the display device may be combined, located in separate structures, and/or separate locations.

According to exemplary embodiments, the display panel 300 may include a plurality of scanning signal lines G1 to Gn, a plurality of data lines D1 to Dm, and a plurality of pixels PX connected to the signal lines G1 to Gn and the data lines D1 to Dm. The pixels PX may be arranged in any suitable formation, such as, for example, in a matrix formation. The display panel may further include a plurality of sensing signal lines SL1 to SLp and a plurality of touch sensors TS connected to the sensing signal lines SL1 to SLp. The touch sensors TS may be arranged in any suitable formation, such as, for example, in a matrix formation. It is noted that "n," "m," and "p" are natural numbers greater than zero. It is also noted that one or more of "n," "m," and "p" may be the same or different.

The scanning signal lines G1 to Gn may extend substantially in a first (e.g., a row or horizontal) direction and may transfer gate signals configured by combining a gate-on voltage, which may turn on one or more switching elements, such as thin film transistors, connected to respective pixels PX and a gate-off voltage, which may turn off the one or more switching elements. The data lines D1 to Dm may extend substantially in a second (e.g., a column or vertical) direction and may transfer data voltages when the one or more switching elements connected to corresponding pixels PX are turned on.

The pixel PX is a unit for displaying an image. In this manner, one pixel may uniquely display any suitable color, such as, for example, one of the primary colors. It is also contemplated that a plurality of pixels PX may alternately display a plurality of colors (e.g., the primary colors) with time to display a desired color by a spatial or temporal sum of the displayed colors (e.g., the displayed primary colors). A common voltage and a data voltage may be applied to each pixel PX.

The sensing signal lines SL1 to SLp may extend substantially in the first direction or substantially in the second direction. The sensing signal lines SL1 to SLp may be connected to the respective touch sensors TS to transfer sensing input signals and sensing output signals. In this manner, the touch sensors TS may generate sensing output signals according to a touch associated with a "self-capacitor" method, which may also be referred to as a "self-capacitance" method. The touch sensors TS may receive the sensing input signals from the sensing signal lines SL1 to SLp and output changes in charge amount due to a touch of an external object, such as a finger, stylus, or other tool, as the sensing output signals through the sensing signal lines SL1 to SLp. To this end, the same signal may be applied to the touch sensors TS and an electrode layer (not shown) of the display panel existing therebelow. In this manner, a parasitic capacitance may be removed between the touch sensors TS and the electrode layer. As such, only the change in charge amount due to the touch may be detected. This is opposed to a conventional "self-capacitance" method, in which both a parasitic capacitance and a change in capacitance associated with a touch are detected. Given that the parasitic capacitance may be removed in association with exemplary embodiments, the touch sensors TS may have improved resistance-capacitance (RC) loading because a noise coupling effect may be avoided through the elimination of the parasitic capacitance. This may further increase detection sensitivity.

According to exemplary embodiments, and although not illustrated, a voltage difference between the voltages applied to the touch sensors TS and the underlying electrode layer may be adjusted to increase or decrease touch sensitivity. It is noted, however, that by introducing the voltage difference between the voltages applied to the touch sensors TS and the underlying electrode layer, varying amounts of parasitic capacitance may be introduced.

With continued reference to FIG. 1, the signal controller 600 may receive input image signals R, G, and B, and control signals CONT thereof. For instance, the control signals CONT may include a horizontal synchronization signal Hsync, a vertical synchronization signal Vsync, a clock signal CLK, a data enable signal DE, and the like. The input image signals R, G, and B and the control signals CONT may be received from any suitable source, such as, for example, a graphic processor (not illustrated), e.g., an external graphic processor. The signal controller 600 may process the image signals R, G, and B in accordance with an operation condition of the display panel 300 based on the image signals R, G, and B and the control signals CONT. In this manner, the signal controller 600 may generate and output image data DAT, a gate control signal CONT1, a data control signal CONT2, and a clock signal (not shown). The signal controller 600 may further output a synchronization signal Sync to the touch sensor controller 700.

The gate control signal CONT1 may include a start pulse vertical signal STV instructing the start of scanning and a clock pulse vertical signal CPV, which is a reference signal for the generation of the gate-on voltage. An output period of the start pulse vertical signal STV may coincide with one (1) frame (or a refresh rate). The gate control signal CONT1 may further include an output enable signal OE limiting a duration time of the gate-on voltage. It is contemplated, however, that the gate control signal CONT1 may further include any other suitable control signal.

The data control signal CONT2 may include a start pulse horizontal signal STH instructing the start of transmission of the image data DAT with respect to pixels PX in a row, a load signal TP instructing a corresponding data voltage to be applied to the data lines D1 to Dm, and the like. The data control signal CONT2 may further include an inversion signal RVS inverting a polarity of the data voltage for the common voltage. It is contemplated, however, that the data control signal CONT2 may further include any other suitable control signal.

The scan driver 400 may apply the gate-on voltage and the gate-off voltage to the scanning signal lines G1 to Gn according to the gate control signal CONT1. The data driver 500 may receive the data control signal CONT2 and the image data DAT from the signal controller 600, and, thereby, convert the image data DAT into data voltages using a gray voltage generated from a gray voltage generator (not illustrated). To this end, the data driver 500 may apply the converted data voltages to the data lines D1 to Dm. The data voltages may include a positive data voltage and a negative data voltage. The positive data voltage and the negative data voltage may be alternately applied based on a frame, and a row and/or a column.

Referring to FIG. 2, the touch sensor controller 700 may generate and transmit sensing scanning signals to be applied to the touch sensors TS. The touch sensor controller 700 may also receive the sensing output signals from the touch sensors TS to generate touch information based thereon. The touch sensor controller 700 may include a timing generator 710, a signal generating/processing unit 720, a signal transmitting/receiving unit 730, a multiplexer 740, and the like.

According to exemplary embodiments, the timing generator 710 may generate and output a scanning enable signal TSE based on the synchronization signal Syn received from the signal controller 600. The signal generating/processing unit 720, which may be a micro control unit (MCU), may generate and output a sensing scanning signal TSS that is generated based on (or under the control of) the scanning enable signal TSE. The signal transmitting/receiving unit 730, which may be an analog front end (AFE) component, may convert and output the sensing scanning signal TSS into an analog signal. The multiplexer 740 may receive a common voltage Vcom from the common electrode 270 of the display panel, as well as the sensing scanning signal TSS. In this manner, the multiplexer 740 may selectively apply the received common voltage Vcom and sensing scanning signal TSS to the sensing signal lines SL1 to SLp. The sensing input signal 1 applied to the touch sensor TS may be a combined signal of the sensing scanning signal TSS and the common voltage Vcom.

The multiplexer 740 and a common voltage supply line 2 may be connected to each other for receiving the common voltage Vcom. As illustrated in FIG. 3, the same signal, that is, the combined signal 1 of the sensing scanning signal TSS and the common voltage Vcom may be applied to the touch sensor TS and the common electrode 270. Since the same signal may be applied to the touch sensor TS and the common electrode 270, a parasitic capacitance Cp between the touch sensor TS and the common electrode 270 may not be generated. As such, only the change in charge amount due to the touch of an external object (e.g., a finger) may be output from the touch sensors TS via the sensing signal lines SL1 to SLp as the sensing signal.

The sensing output signal may be transferred to the MCU 720 via the multiplexer 740 and the signal transmitting/receiving unit 730. The signal generating/processing unit 720 may read the sensing output signal and may generate touch information, such as touch existence or not and a touch location, based on the sensing scanning signal TSS. For example, when a finger touches a touch sensor TS, an amplitude of the sensing output signal may be smaller than that of the sensing scanning signal TSS, and the signal generating/processing unit 720 may determine that a touch event has occurred when a difference between the amplitudes is larger than a determined value.

According to exemplary embodiments, the scan driver 400, the data driver 500, the signal controller 600, the touch sensor controller 700, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, one or more of the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, the scan driver 400, the data driver 500, the signal controller 600, the touch sensor controller 700, and/or one or more components thereof may include or otherwise be associated with one or more memories (not shown) including code (e.g., instructions) configured to cause the scan driver 400, the data driver 500, the signal controller 600, the touch sensor controller 700, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Figure 4:
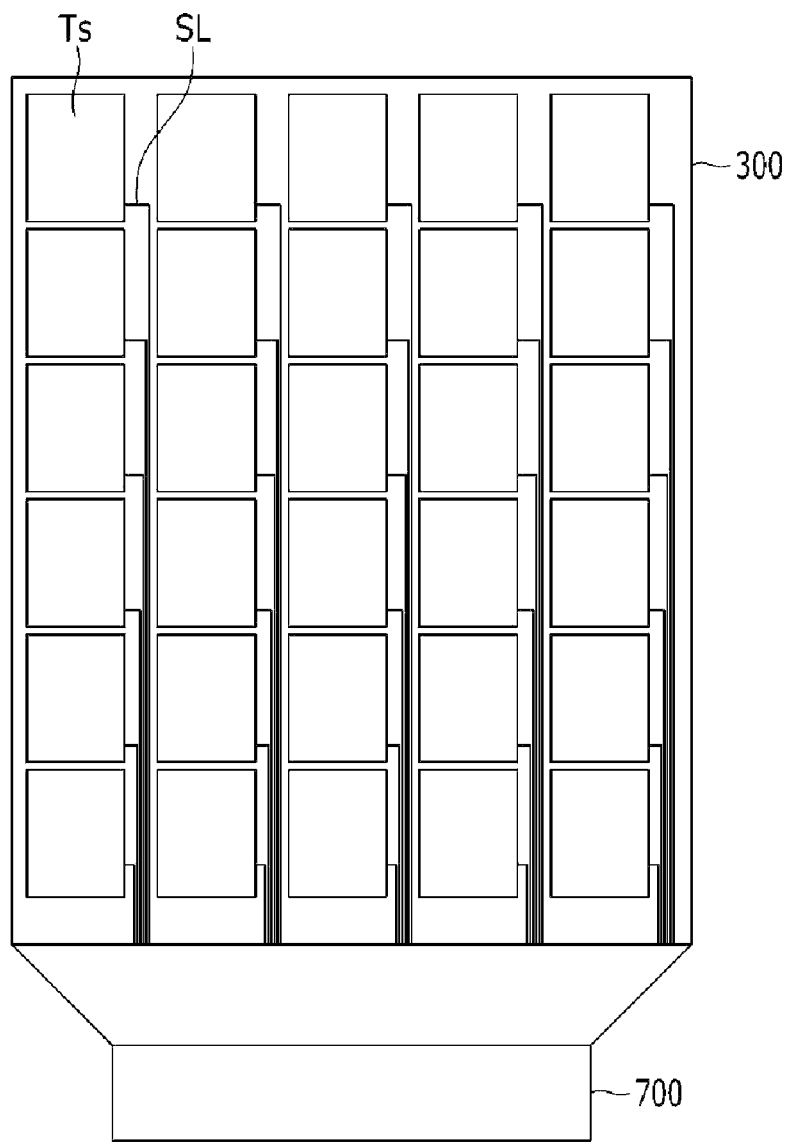
FIG. 4 is a plan view illustrating a pattern of touch sensors, according to exemplary embodiments.
Figure 5:
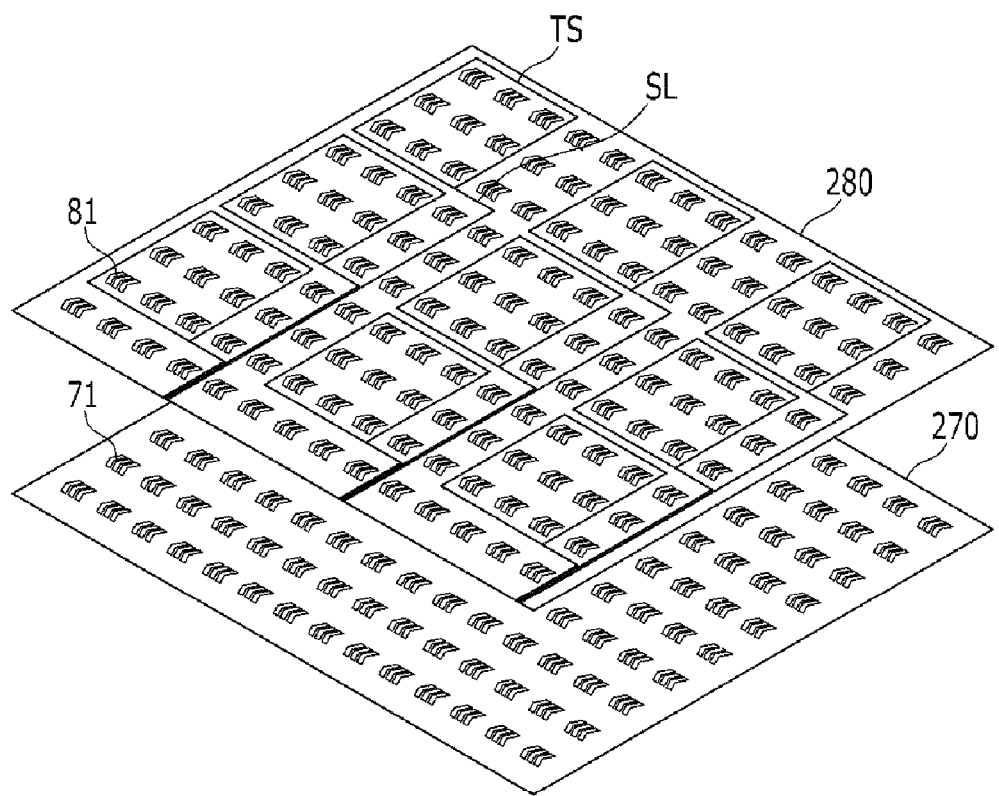
FIGS. 5 and 6 are respective patterns of touch sensors and sensing signal lines, according to exemplary embodiments.
Figure 6:
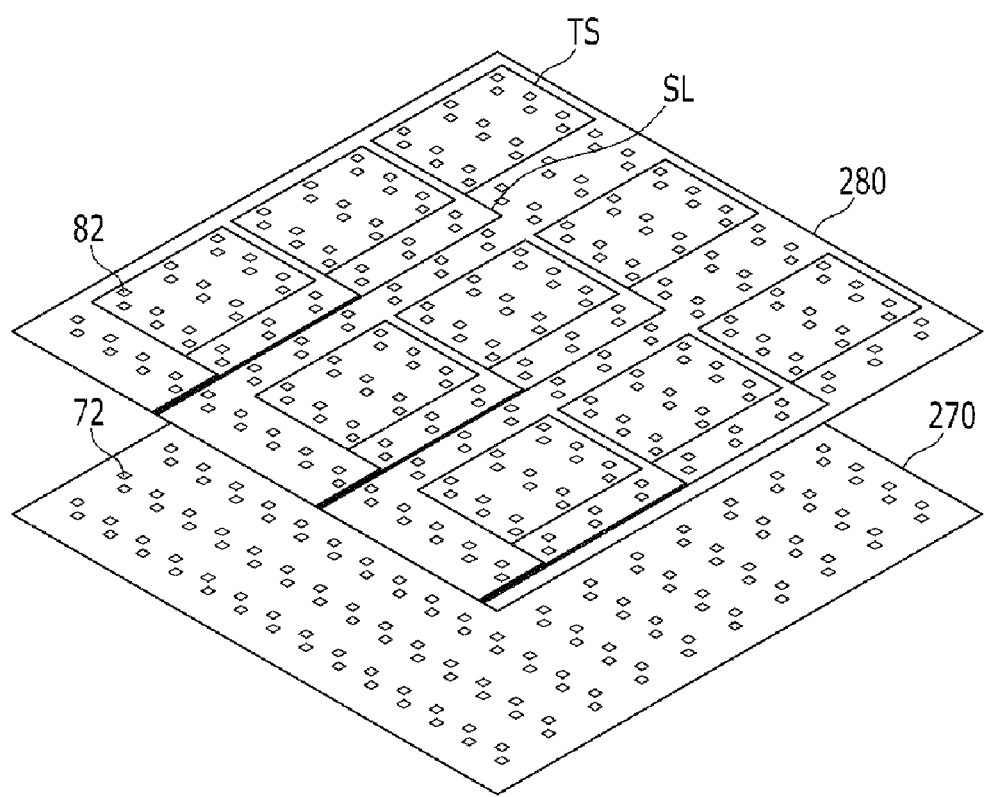

FIG. 4 is a plan view illustrating a pattern of touch sensors, according to exemplary embodiments. FIGS. 5 and 6 are respective patterns of touch sensors and sensing signal lines, according to exemplary embodiments.

Referring to FIG. 4, the touch sensors TS, which may be arranged in a matrix formation, may be made of any suitable transparent conductive materials, such as, for example, aluminum zinc oxide (AZO), gallium zinc oxide (GZO), indium tin oxide (ITO), indium zinc oxide (IZO), carbon nanotube (CNT), etc. The touch sensors TS may have any suitable shape, such as, for instance, the shape of a quadrangle, a triangle, a circle, etc., and may have any suitable size, such as, for example, several millimeters. For example, when the touch sensors TS are shaped as quadrangles, a length of one side may be about 3 to 5 mm. The size of the touch sensors TS may vary according to a contact area where an object touches the display panel 300.

The plurality of pixels PX may be positioned in a region of one or more touch sensor TS. For example, several tens to hundreds of pixels PX may be positioned in a region of one touch sensor TS. It is contemplated, however, that any suitable density of pixels PX corresponding to a touch sensor TS may be utilized, which may be based on a resolution of the display device and the like.

The touch sensors TS and the sensing signal lines SL connected thereto may be formed with the same material, and, thereby, formed utilizing any suitable patterning technique(s). For example, the plurality of touch sensors TS and the sensing signal lines SL may be simultaneously formed utilizing a mask by laminating and patterning an ITO layer. The signal lines SL may be formed on the display panel to overlap with a light blocking member (a black matrix), as will become more apparent below. It is noted that the sensing signal lines SL may be connected to the touch sensor controller 700.

Referring to FIG. 5, the touch sensors TS and the sensing signal lines SL may be fabricated by forming and patterning a touch sensor layer 280 having the same (or substantially the same) shape as the common electrode 270 on the common electrode 270 of the display panel 300. For example, in the case where cutouts 71 are formed in each pixel area of the common electrode 270, cutouts 81 having the same (or substantially the same) shape as the cutout 71 of the common electrode 270 may be formed in the touch sensor layer 280. It is noted that the cutouts 71 and 81 and may overlap with each other. The cutouts 81 of the touch sensor layer 280 may be formed by the same process when patterning the touch sensors TS and the sensing signal lines SL. In other words, the touch sensors TS, the sensing signal lines SL, and the cutouts 81 may be formed using one mask. It is contemplated, however, that one or more mask and/or patterning steps may be utilizing in association with exemplary embodiments described herein. Similarly, in FIG. 6, the touch sensor layer 280 may have the same (or substantially the same) pattern 82 as pattern 72 formed in the common electrode 270. To this end, the patterns 82 may be formed when patterning the touch sensors TS and the sensing signal lines SL. Further, the patterns 72 and 82 may overlap (or substantially overlap) one another.

Adverting back to FIG. 5, the touch sensors TS may be patterned so that edges thereof are positioned at (or near) a portion where the cutouts 81 are not formed. In this manner, the edges of the touch sensors TS may be positioned to overlap with a light blocking member in the display panel 300, as will become more apparent below, such as in association with FIGS. 7 and 8. The signal lines SL may be further patterned to be positioned at (or near) a portion where the cutouts 81 are not formed. When the same pattern as the pattern formed in the common electrode 270 is formed in the touch sensor layer 280, an effect of the touch sensor layer 280 on an electric field generated between the common electrode 270 and the pixel electrode during driving of the display panel 300 may be minimized (or at least reduced).

Figure 7:
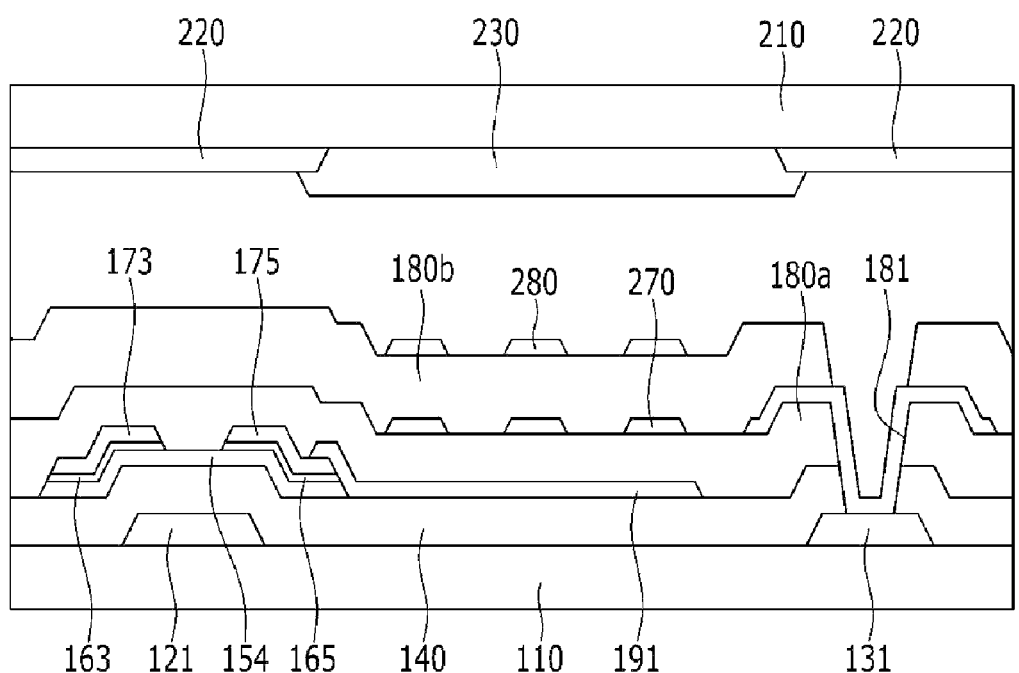
FIGS. 7 and 8 are respective cross-sectional views of display devices including touch sensors, according to exemplary embodiments.
Figure 8:
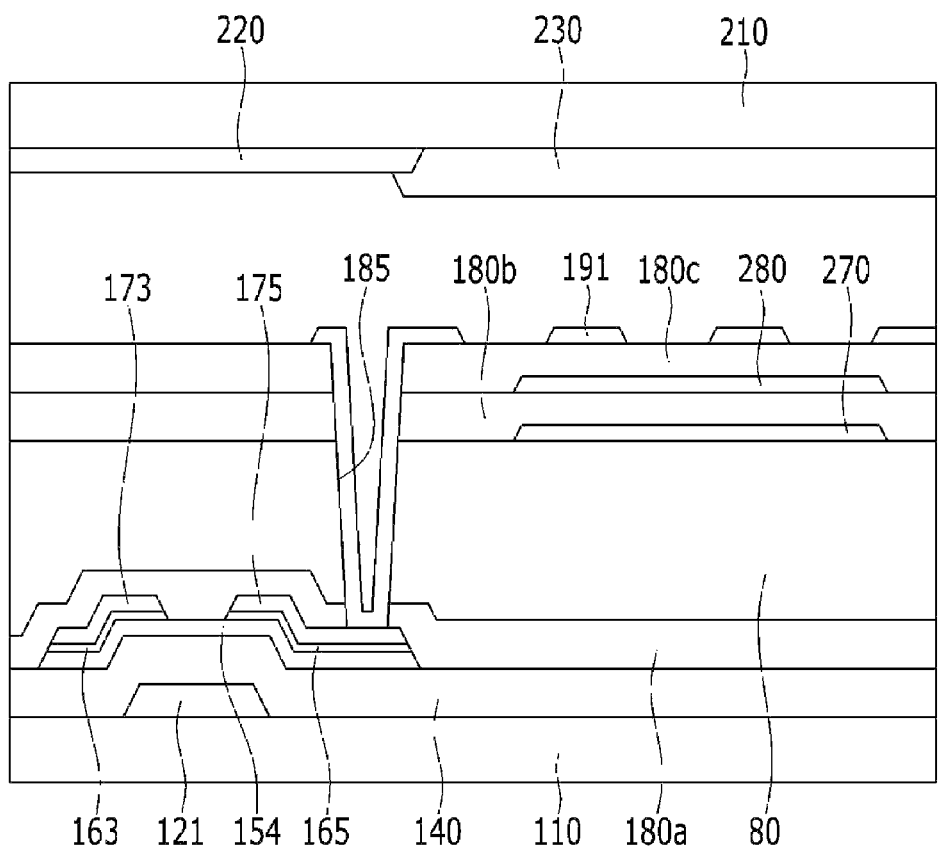
Figure 9:
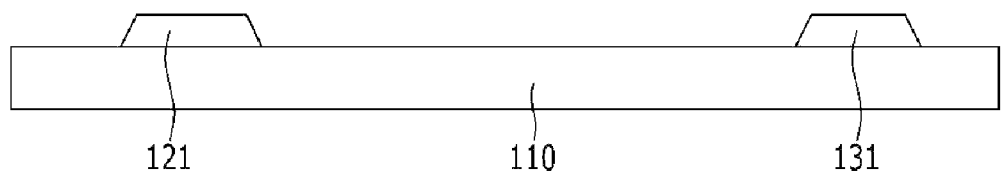
FIGS. 9 to 15 are respective cross-sectional views of a panel of the display device of FIG. 7 at various stages of manufacture, according to exemplary embodiments.
Figure 10:
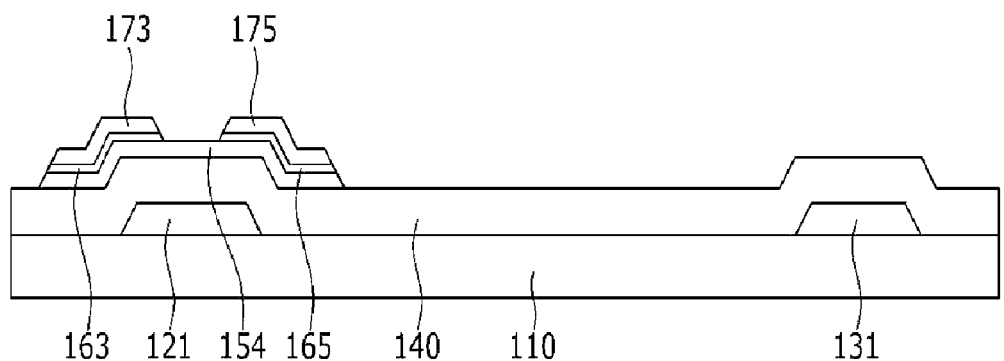

FIGS. 7 and 8 are respective cross-sectional views of display devices including touch sensors, according to exemplary embodiments. FIGS. 9 to 15 are respective cross-sectional views of a panel of the display device of FIG. 7 at various stages of manufacture, according to exemplary embodiments. It is noted that FIGS. 9 to 15 focus on the fabrication of the first (or lower) panel of the display device of FIG. 7.

Referring to FIG. 7, the display device may have a structure in which a plurality of layers is laminated (or otherwise stacked) on a lower substrate 110 (which may be a transparent insulation substrate) and an upper substrate 210 (which may also be a transparent insulation substrate). An upper surface of the upper substrate 210 may be utilized as a touch surface, which may be touched by a user of the display device. The lower substrate 110 and the layers formed thereon may be collectively referred to as a first (or lower) panel, and the upper substrate 210 and the layers formed thereon may be collectively referred to as a second (or an upper) panel. For a liquid crystal display, a liquid crystal layer may be included between the lower panel and the upper panel.

With respect to the lower panel, a gate conductor including a gate line 121 and a common voltage line 131 may be formed on the lower substrate 110. The gate conductor may be made of any suitable material, such as, for example, an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal, such as molybdenum (Mo) or a molybdenum alloy, chromium (Cr), tantalum (Ta), titanium (Ti), and/or the like. According to exemplary embodiments, the gate conductor may have a single layer or a multilayer structure including two or more conductive layers having, for instance, different physical and/or electrical properties (or characteristics).

A gate insulating layer 140, which may be made of any suitable insulating material, e.g., silicon nitride ($Si_xN_y$), and/or the like, may be formed on the gate conductors, e.g., the gate line 121 and the common voltage line 131. The gate insulating layer 140 may have a single or a multilayer structure including at least two insulating layers having different physical and/or insulating properties. A semiconductor 154, which may be made of any suitable semiconductor material, such as, for instance, hydrogenated amorphous silicon (a-Si), polycrystalline silicon (poly-Si), or the like, may be formed on the gate insulating layer 140. A plurality of ohmic contacts 163 and 165, which may be made of any suitable ohmic contact material, e.g., silicide, n+ hydrogenized amorphous silicon in which n-type impurities are doped at a high concentration, or the like, may be formed on the semiconductor 154.

In exemplary embodiments, a data conductor including a data line (not illustrated), a source electrode 173, and a drain electrode 175 may be formed on the ohmic contacts 163 and 165. The semiconductor 154, the gate line 121 overlapping the semiconductor 154, the source electrode 173, and the drain electrode 175 may form a thin film transistor. A pixel electrode 191 may be formed on the drain electrode 175 and the gate insulating layer 140 in at least a display area of a pixel PX of the display device. The pixel electrode 191 may contact a part of the drain electrode 175. The pixel electrode 191 may be made of any suitable transparent conductive material, such as, for example, AZO, GZO, ITO, IZO, etc. It is also contemplated that one or more conductive polymers (ICP) may be utilized, such as, for example, polyaniline, poly(3,4-ethylenedioxythiophene) poly(styrenesulfonate) (PEDOT:PSS), etc.

A first passivation layer 180a may be formed on the thin film transistor and the pixel electrode 191, as well as the gate insulating layer 140. The first passivation layer 180a may be made of any suitable inorganic insulator, such as, for example, silicon nitride ($Si_xO_y$), silicon oxide ($Si_xO_y$), etc., or any suitable organic insulator. A contact hole 181 exposing the common voltage line 131 may be formed through the first passivation layer 180a and the gate insulating layer 140. A common electrode 270 may be formed on the first passivation layer 180a. The common electrode 270 may receive a common voltage Vcom from the common voltage line 131 through the contact hole 181. The common electrode 270 may have a plurality of cutouts, such as described in association in with FIGS. 5 and 6. The common electrode 270 may be made of any suitable transparent conductive material, such as, for example, AZO, GZO, ITO, IZO, etc. It is also contemplated that one or more ICPs may be utilized, such as, for example, polyaniline, PEDOT:PSS, etc.

According to exemplary embodiments, a second passivation layer 180b may be formed on the common electrode 270 and the first passivation layer 180a. The second passivation layer 180b may be made of any suitable insulating material, such as, for example, the same material as the first passivation layer 180a. A touch sensor layer 280 may be formed on the second passivation layer 180b. The touch sensor layer 280 may have cutouts formed to correspondingly overlap with respective cutouts in the common electrode 270, as previously described in association with FIGS. 5 and 6.

With respect to the upper panel, a light blocking member 220 and a color filter 230 may be formed on the upper substrate 210. The light blocking member 220 may be referred to as a black matrix, and may be configured to block light leakage between adjacent pixels PX. The color filter 230 may be disposed in an opening region surrounded by the light blocking member 220, which may be defined as a pixel area that may selectively transmit light. It is noted that the color filter 230 may partially overlap the light blocking member 220. At least one of the color filter 230 and the light blocking member 220 may also (or alternatively) be formed on the lower panel.

As seen in FIG. 7, the display device may have a structure in which the first passivation layer 180a is formed between the pixel electrode 191 and the common electrode 270, and the second passivation layer 180b is formed between the touch sensor layer 280 and the common electrode 270, such that the pixel electrode 191, the first passivation layer 180a, the common electrode 270, the second passivation layer 180b, and the touch sensor layer 280 are disposed on the lower substrate 110. It is contemplated, however, that the display device may have an alternative structure and configuration with respect to the common electrode 270, the touch sensor layer 280, and the pixel electrode 191, as well as the passivation layers 180a-180c, as will be described in more detail in association with FIG. 8.

Referring to FIG. 8, the display device may be configured substantially similar to the display device of FIG. 7, and, as such, to avoid obscuring exemplary embodiments described herein, primarily differences are provided below. As seen in FIG. 8, the first passivation layer 180a may be formed on the thin film transistor and the gate insulating layer 140. In this manner, an organic layer 80 may be formed on the first passivation layer 180a. The organic layer 80 may have a larger thickness than the first passivation layer 180a and may have a flat (or otherwise planar) upper surface. The organic layer 80 may be a color filter.

In exemplary embodiments, the common electrode 270 may be formed on the organic layer 80. The second passivation layer 180b may be formed on the common electrode 270 and the organic layer 80. The touch sensor layer 280 may be formed on the second passivation layer 180b with the third passivation layer 180c formed on the touch sensor layer 280 and the second passivation layer 180b. The third passivation layer 180c may be made of any suitable insulating material, such as, for example, the same material as the first and/or second passivation layers 180a and 180b. The pixel electrode 191 may include the plurality of cutouts and, as previously mentioned, may be formed on the third passivation layer 180c. The pixel electrode 191 may be connected to the drain electrode 175 through the contact hole 185 formed through the first to third passivation layers 180a, 180b, and 180c and the organic layer 80.

As previously mentioned, FIGS. 9 to 15 are respective cross-sectional views of the lower panel of the display device of FIG. 7 at various stages of manufacture. At a first state, the gate line 121 and the common voltage line 131 are fabricated by forming and patterning the gate conductors on the lower substrate 110 (see FIG. 9). At a second state, the thin film transistor is fabricated by forming and patterning the semiconductor 154, the ohmic contacts 163 and 165, and the data conductors (e.g., the source electrode 173 and the drain electrode 175), after forming the gate insulating layer 140 on the gate line 121, the common voltage line 131 and the lower substrate 110 (see FIG. 10).

Figure 11:
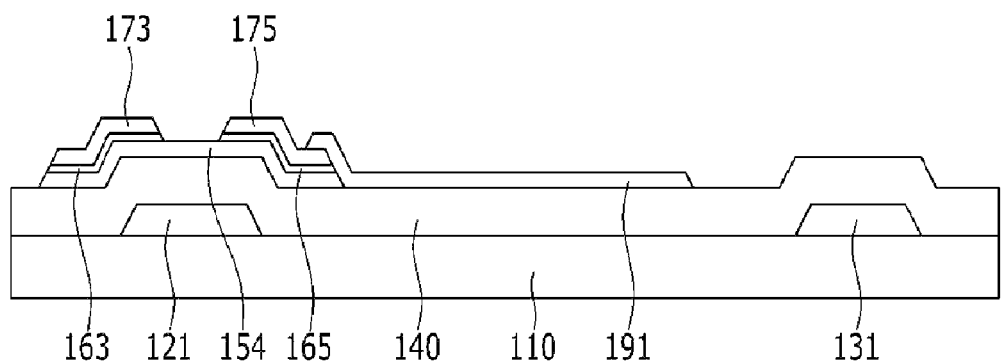
Figure 12:
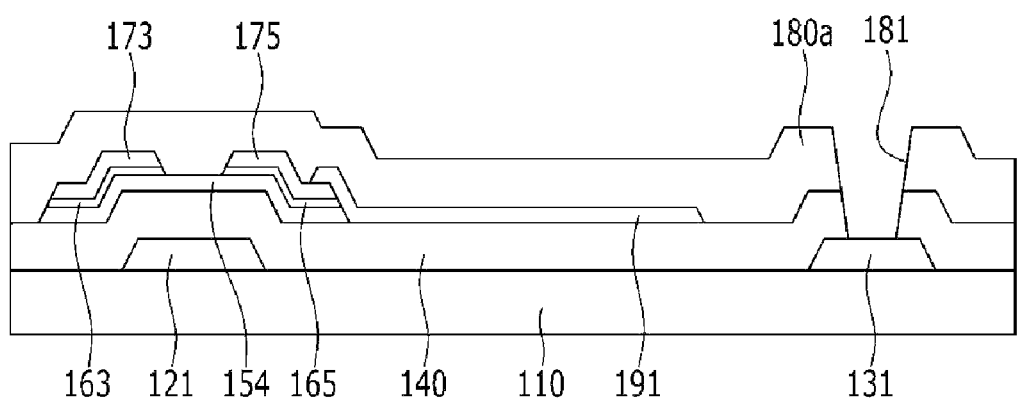
Figure 13:
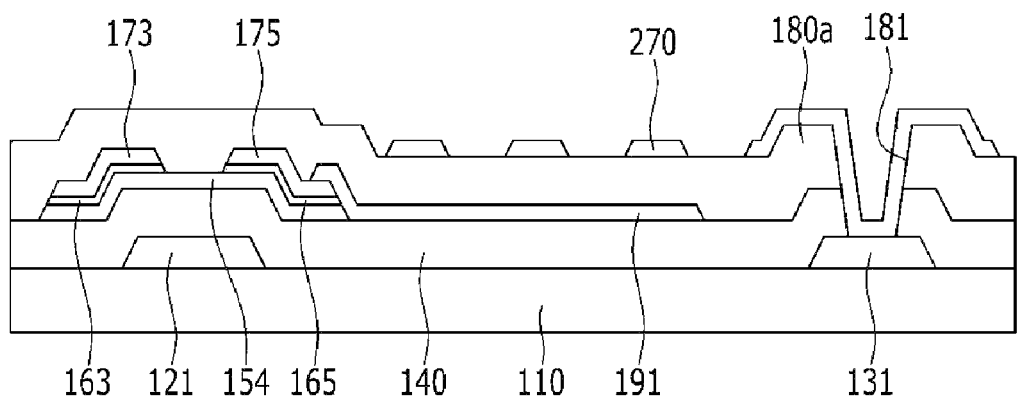
Figure 14:
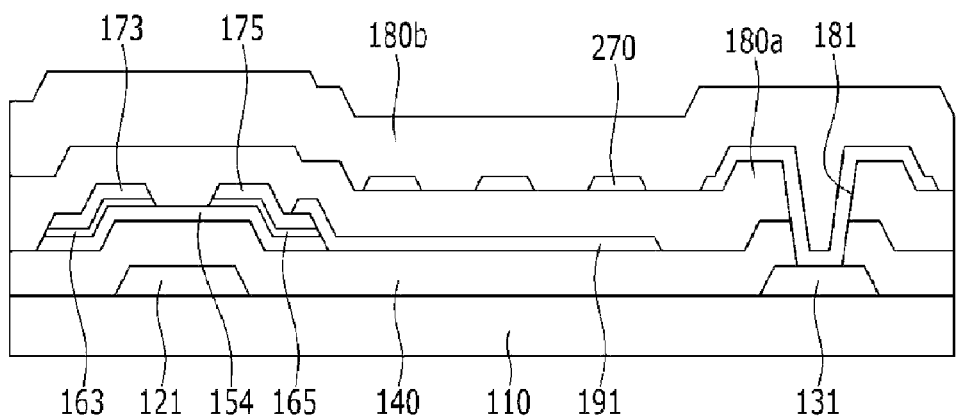
Figure 15:
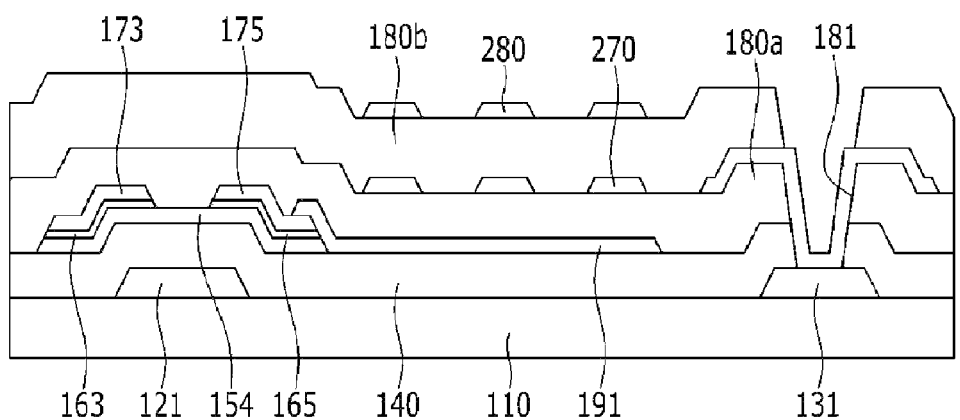

Referring to FIG. 11, the pixel electrode is formed on the drain electrode 175 and the gate insulating layer 140. The first passivation layer 180a is formed on the pixel electrode 191 and the thin film transistor, as seen in FIG. 12. To this end, the contact hole 181 is formed through the first passivation layer 180a and the gate insulating layer 140 to at least partially expose the common voltage line 131. At another state, the common electrode 270 is formed on the first passivation layer 180a and connects with the common voltage line 131 through the contact hole 181 (see FIG. 13). As seen in FIG. 14, the second passivation layer 180b is formed on the common electrode 270 and the first passivation layer 180a. At yet another state, the touch sensor layer 280 is formed on the second passivation layer 180b, as seen in FIG. 15.

According to exemplary embodiments, since the first passivation layer 180a and the second passivation layer 180b may be formed using the same mask, although two patterning processes may be added to the manufacturing method of the display device without the touch sensor for a total of seven patterning processes, only one mask for forming the touch sensor layer 280 may be added for a total of six masks. It is contemplated, however, that any suitable number of patterning processes and/or masks may be utilized in association with exemplary embodiments described herein. Once the touch sensor layer 280 is formed, the display device including the touch sensor in one or more cells may be manufactured, such as described in association with FIGS. 5 and 6.

Figure 16:
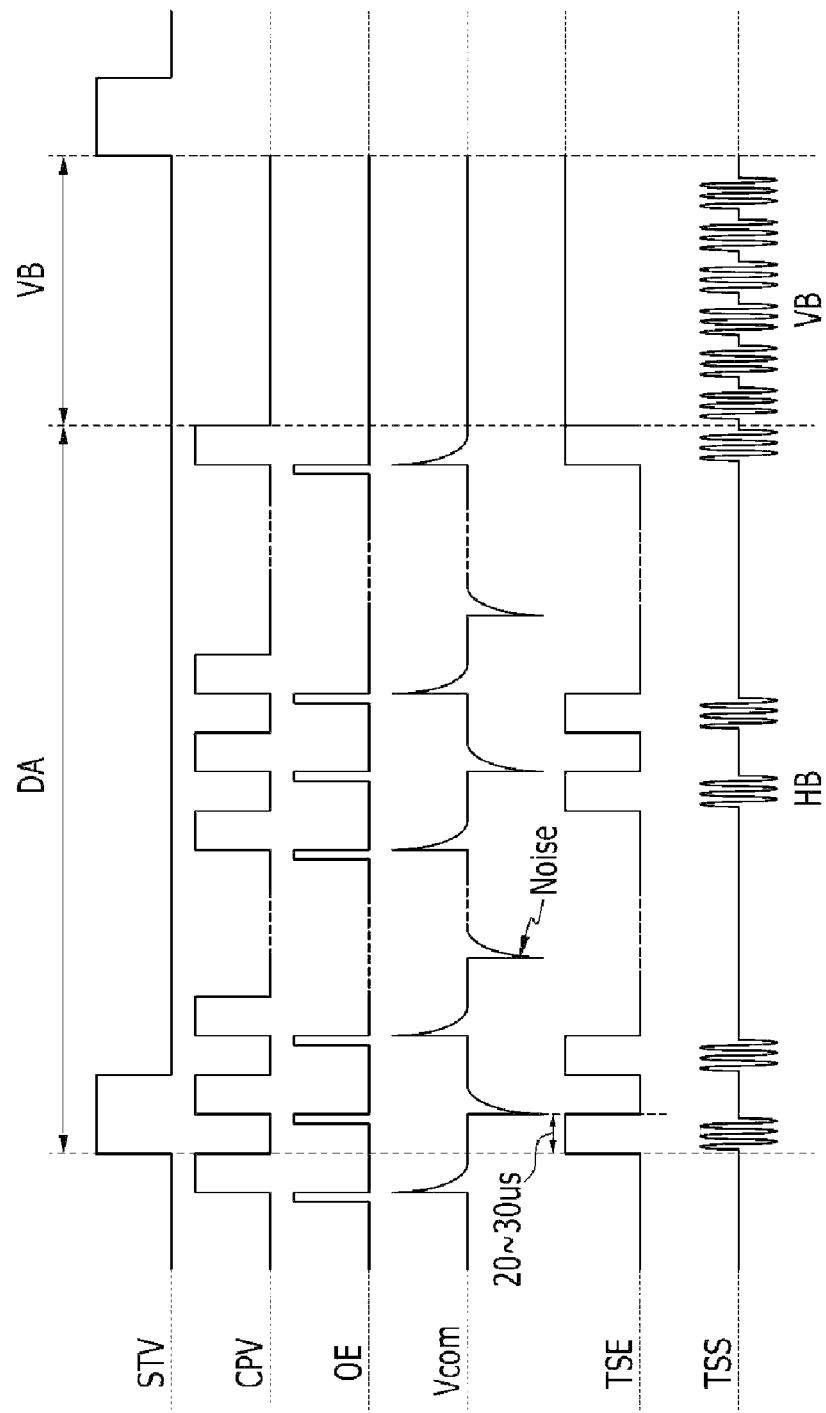
FIG. 16 is a waveform diagram illustrating a signal applied to the display device including touch sensors, according to exemplary embodiments.
Figure 17:
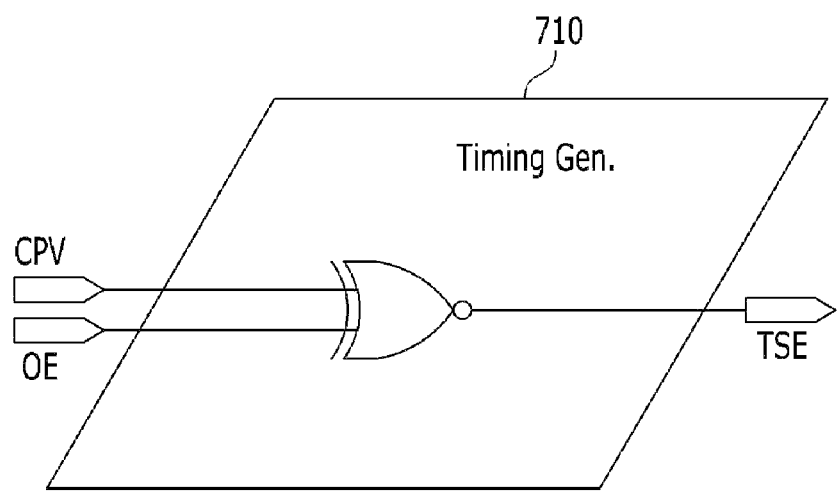
FIG. 17 is a schematic circuit diagram of a timing generator included in a touch sensor controller, according to exemplary embodiments.

FIG. 16 is a waveform diagram illustrating a signal applied to the display device including touch sensors, according to exemplary embodiments. FIG. 17 is a schematic circuit diagram of a timing generator included in a touch sensor controller, according to exemplary embodiments.

The start pulse vertical signal STV may be output for every 1 frame, and a 1 frame period includes a display active DA period and a vertical blank VB period between display active DA periods. For the display active DA period, the clock pulse vertical signal CPV related with the gate-on voltage, the output enable signal OE, and the like, are output from the signal controller 600, and for the vertical blank VB period, the clock pulse vertical signal CPV and the output enable signal OE are not output. The common voltage Vcom may be applied throughout the display active DA period and the vertical blank VB period, but for the display active DA period, noise of changing the common voltage Vcom by a transition of the data voltage may be generated. As illustrated in FIG. 16, the noise may be generated when the clock pulse vertical signal CPV, which is a reference of the generation of the gate-on voltage, is output.

Since the noise of the common voltage Vcom is generally larger than the sensing scanning signal TSS, when the noise of the common voltage Vcom and the sensing scanning signal TSS overlap with each other, the sensing output signal overlapping with the common voltage noise may be covered by the common voltage noise, thereby, making it difficult to detect the sensing output signal. As such, for a horizontal blank HB period when the noise of the common voltage is not generated, the sensing scanning signal TSS is output, and the sensing output signal is read. A minimum scanning/reading time may be about 20 to 30 µs.

For the horizontal blank HB period, to generate the sensing scanning signal TSS, the timing generator 710 of the touch sensor controller 700 may receive the clock pulse vertical signal CPV and the output enable signal OE from the signal controller 600 and generate the scanning enable signal TSE based thereon. A HIGH period of the scanning enable signal TSE may be a period between a falling edge of the clock pulse vertical signal CPV and a rising edge of the output enable signal OE. To generate the scanning enable signal TSE, the timing generator 710 may include an XNOR logic circuit as illustrated in FIG. 17. Since the XNOR logic circuit outputs a HIGH signal when two input signals are either both high or both low, then only when both the clock pulse vertical signal CPV and the output enable signal OE are both high (or both low), will the scanning enable signal TSE be high. Further, the signal generating/processing unit 720 of the touch sensor controller 700 may generate the sensing scanning signal TSS only when the scanning enable signal TSE is high to output and read the generated sensing scanning signal TSS.

According to exemplary embodiments, the sensing scanning signal TSS may have various waveforms and voltage levels. For example, the sensing scanning signal TSS may include pulses that are periodically output and may also include at least two different voltage levels. The sensing scanning signal TSS may be an alternating current (AC) voltage changed based on a determined voltage level. In this manner, the sensing scanning signal TSS may have any suitable waveform and voltage level.

Since the sensing scanning signal TSS may be generated substantially without interference of noise associated with the horizontal blank HB period even for the display active DA period when the common voltage noise is generated, a report rate of the sensing scanning signal TSS may be increased. For example, in a display device operating at a driving frequency of 60 Hz, when only for the vertical blank VB period when the common voltage noise is not generated, the sensing scanning signal TSS is generated, the report rate may be 60 Hz, which is the same as the driving frequency. However, when the sensing scanning signal TSS is generated in synchronization with the horizontal blank HB period, since the signals may be generated in correspondence with the number of horizontal scan lines (or gate lines) of the display panel, the report rate may be at least 100 Hz, which is much higher than 60 Hz. As such, a sufficient report rate may be ensured despite a lower operating driving frequency.

Figure 18:
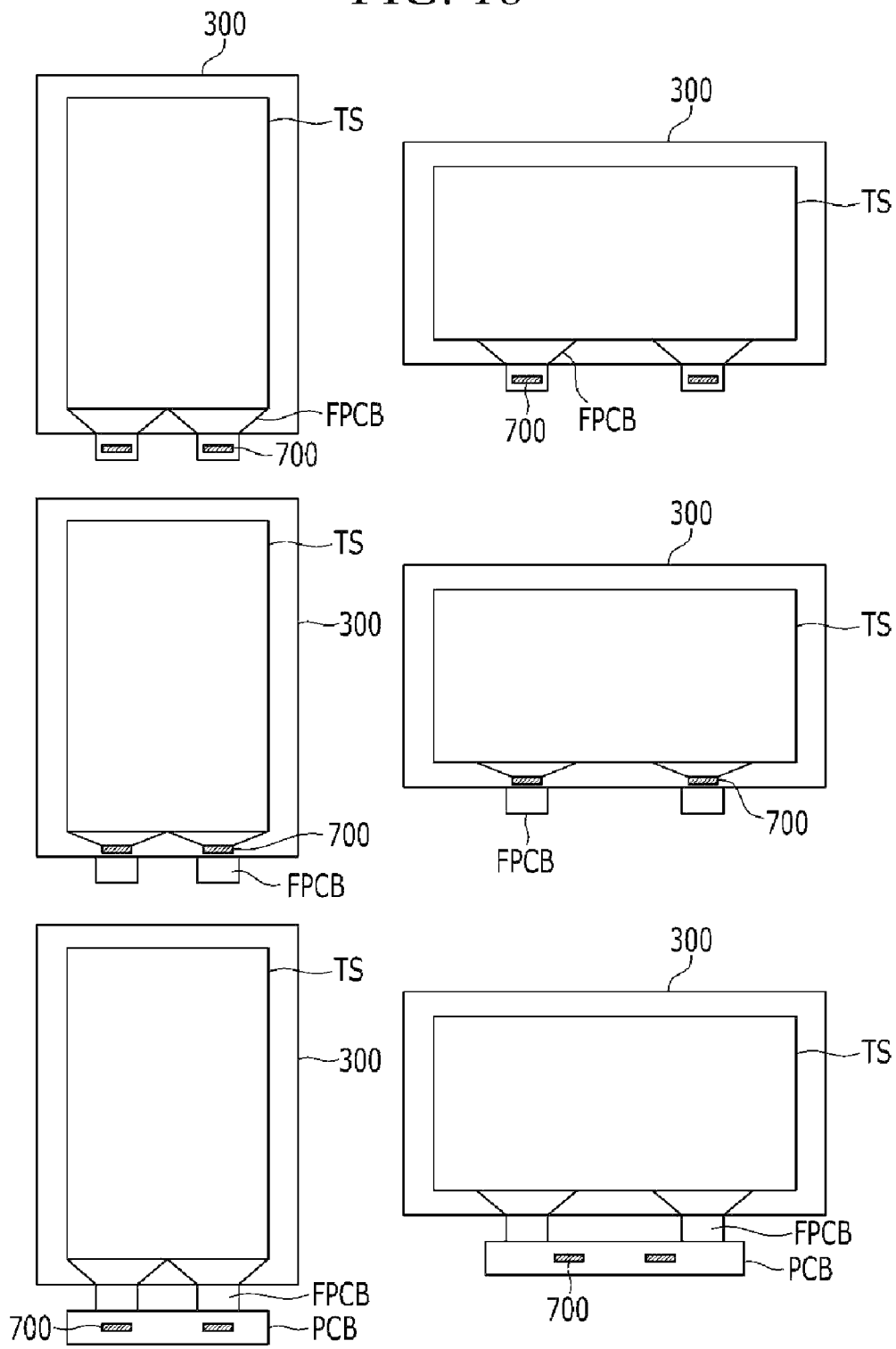
FIGS. 18 to 20 are schematic diagrams illustrating various module structures of display devices, according to exemplary embodiments.
Figure 19:
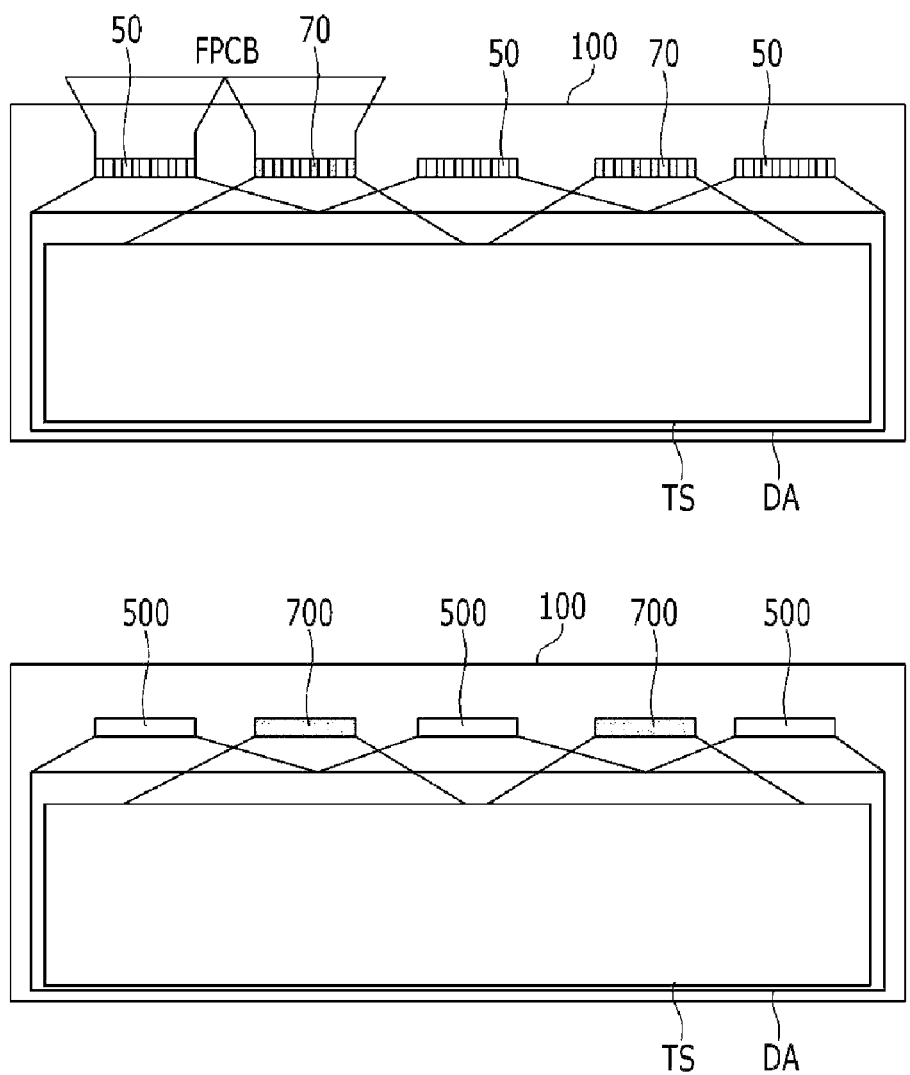
Figure 20:
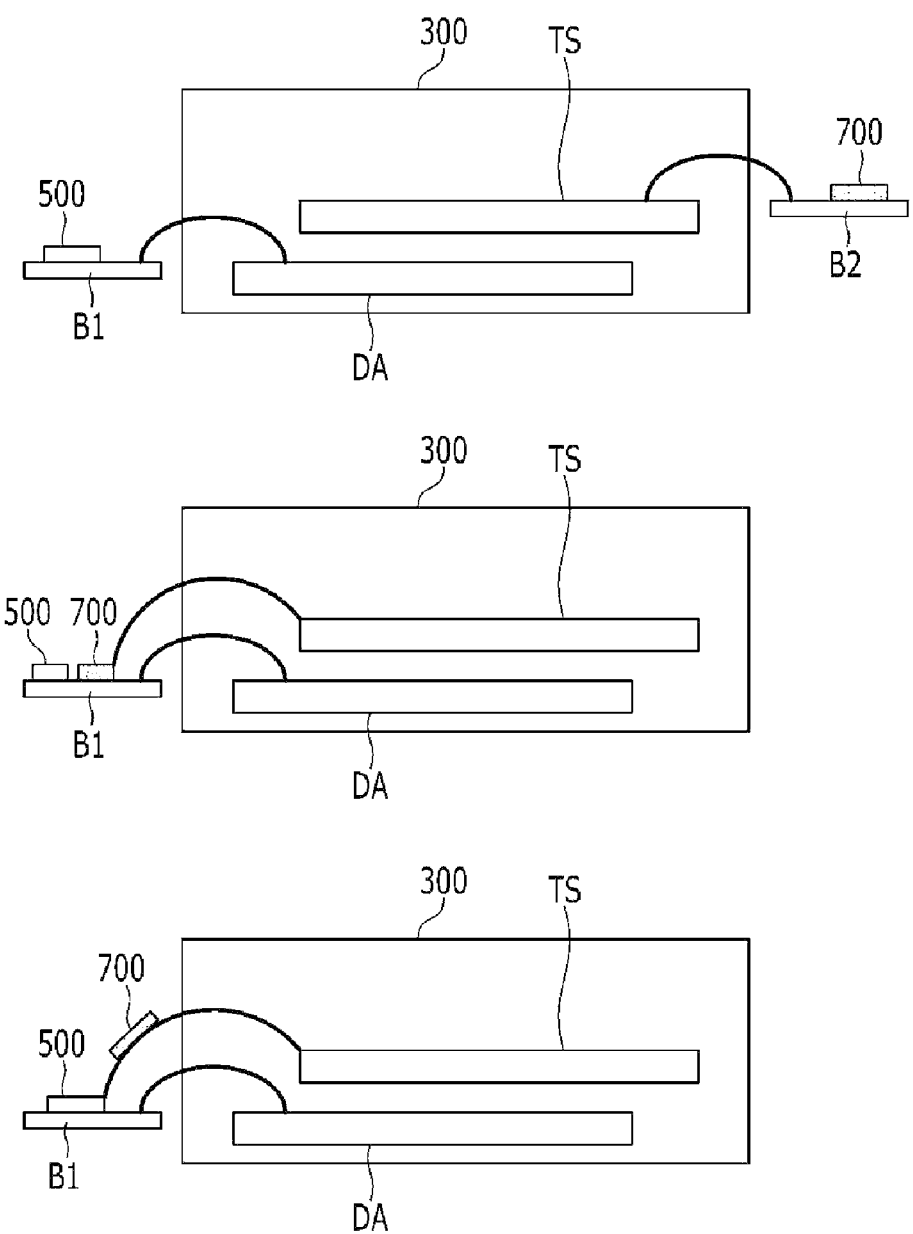

FIGS. 18 to 20 are schematic diagrams illustrating various module structures of display devices, according to exemplary embodiments.

In FIG. 18, three structures are illustrated according to a location where the touch sensor controller 700, which may be an integrated circuit (IC), may be positioned are illustrated. The configurations illustrated on the left side of the page correspond to portrait configurations of the display device, whereas the configurations illustrated on the right side of the page correspond to landscape configurations of the display device. The two uppermost configurations illustrate chip on film (COF) structures in which the touch sensor controller 700 is disposed on a flexible printed circuit board FPCB. The middle set of configurations illustrate chip on glass (COG) structures in which the touch sensor controller 700 is disposed on an organic substrate, such as, for example, the aforementioned lower substrate 110. The lowermost configurations illustrate a chip on board (COB) structure in which the touch sensor controller 700 is disposed on a printed circuit board (PCB). The display devices may have one or more touch sensor controllers 700, which may be based on the size of the display device and/or the number of touch sensors that the display device includes. To this end, each of the illustrations in FIG. 18 include two touch sensor controllers 700, but, as previously mentioned, exemplary embodiments may include any suitable number of touch sensor controllers 700.

In FIG. 19, a position relationship between one or more data drivers 500 and one or more touch sensor controllers 700 is illustrated. The uppermost configuration illustrates a bonding pad 50 for a flexible printed circuit board (FPCB) being utilized for the data driver 500 and a bonding pad 70 for a flexible printed circuit board (FPCB) for the touch sensor controller 700, which are alternately positioned on the substrate when the data driver 500 and the touch sensor controller 700 have the chip on film (COF) or the chip on board (COB) structure. The lowermost configuration illustrates the touch sensor controller 700 being positioned between the data drivers 500 when the data drivers 500 and the touch sensor controllers 700 have chip on glass (COG) structures.

In FIG. 20, the uppermost configuration illustrates the touch sensor controller 700 being disposed on separate touch sensor boards B2, the middle configuration illustrates both the data driver 500 and the touch sensor controller 700 being positioned on a display drive board B1, and the lowermost configuration illustrates the data driver 500 and the touch sensor controller 700 being positioned on a flexible printed circuit board, but connected to the display drive board B1. For convenience, however, the lowermost configuration illustrates the data driver 500 being positioned on the display drive board B1.

Figure 21:
FIGS. 21 and 22 are respective cross-sectional views of display devices including touch sensors, according to exemplary embodiments.
Figure 22:
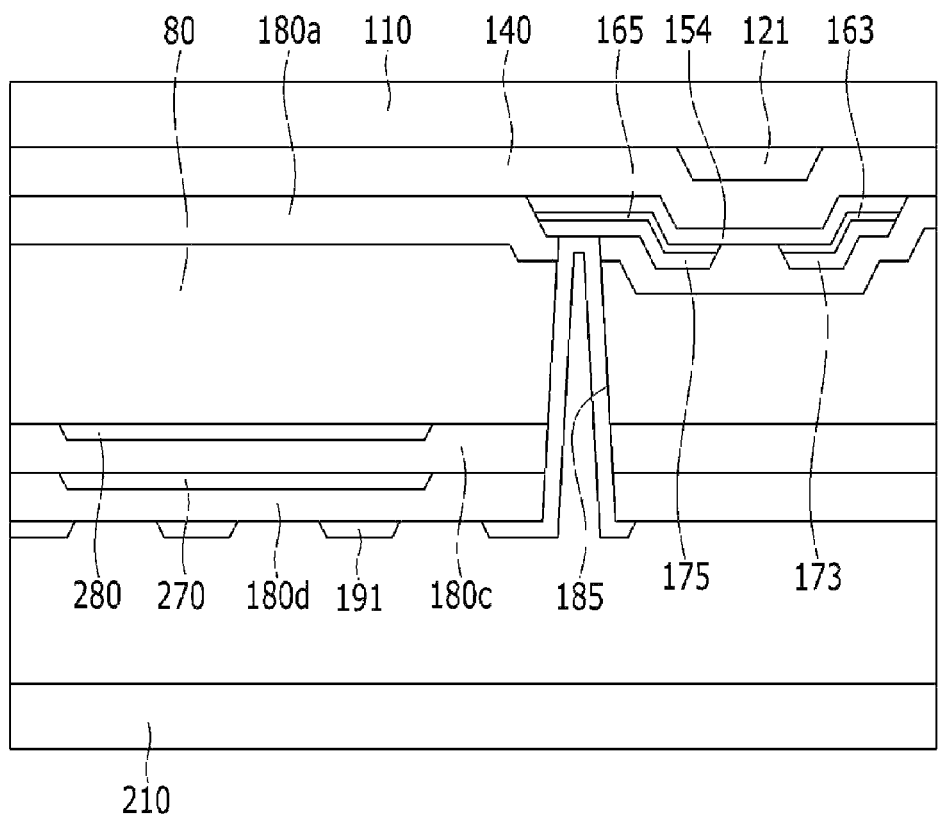

FIGS. 21 and 22 are respective cross-sectional views of display devices including touch sensors, according to exemplary embodiments.

The display devices of FIGS. 21 and 22 have a reverse structure of the display devices respectively illustrated in FIGS. 7 and 8, but positions of the common electrode 270 and the touch sensor layer 280 are different in FIGS. 21 and 22. That is, the touch sensor layer 280 is positioned to be closer to the substrate 110 than the common electrode 270. That is, the touch sensor layer is disposed between the pixel electrode 191 and the common electrode 270. In this manner, after the touch sensor layer 280 is formed, the common electrode 270 is formed. To this end, any given touch sensor TS may sense an object touching an upper surface of the substrate 110 versus the substrate 210, as in the display devices of FIGS. 7 and 8. To this end, it is noted that the panel associated with substrate 210 in each of FIGS. 21 and 22 is illustrated in a simplified manner, e.g., without color filter 230 and light blocking member 220, to avoid obscuring exemplary embodiments described herein.

FIGS. 23 to 27 are respective cross-sectional views of modified structures of the touch sensors, according to exemplary embodiments. It is noted that each of the configurations of the aforementioned touch sensors may be utilized in association with the modified examples, unless stated otherwise or described differently.

Figure 23:
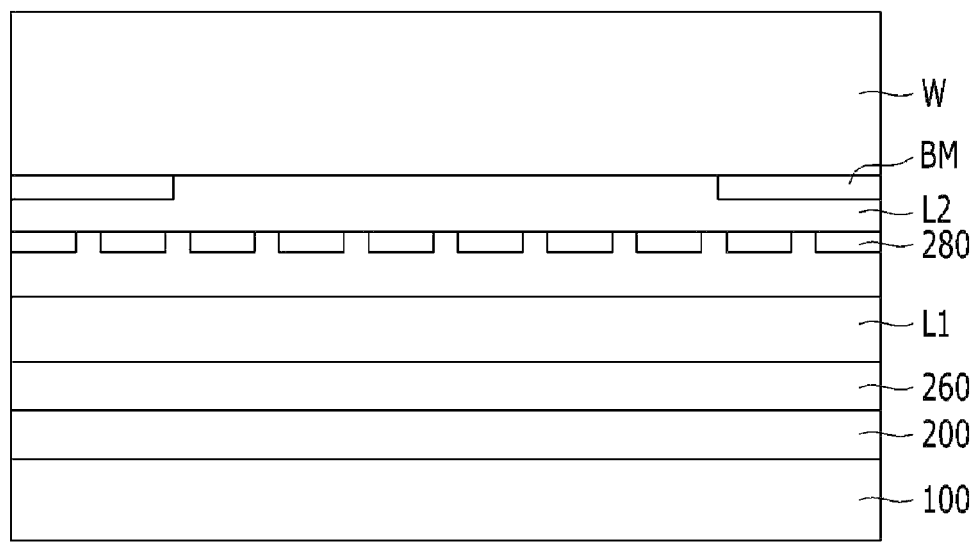
FIGS. 23 to 27 are respective cross-sectional views of modified structures of the touch sensors, according to exemplary embodiments.

FIG. 23 illustrates an add-on structure in which the touch sensor layer 280 is formed on an anti-static layer 260 made of a transparent conductive material, such as ITO, on the upper panel 200 of the display panel, which includes both the lower panel 100 and the upper panel 200. The touch sensor layer 280 may be fabricated by forming and patterning a layer on a film with a transparent conductive material, such as ITO, and then attached to the anti-static layer 260 via an adhesive layer L1 together with the film. A cover window W may be attached on the touch sensor layer 280 using an adhesive layer L2. A black matrix BM may be disposed between the cover window W and the anti-static layer 260.

Figure 24:
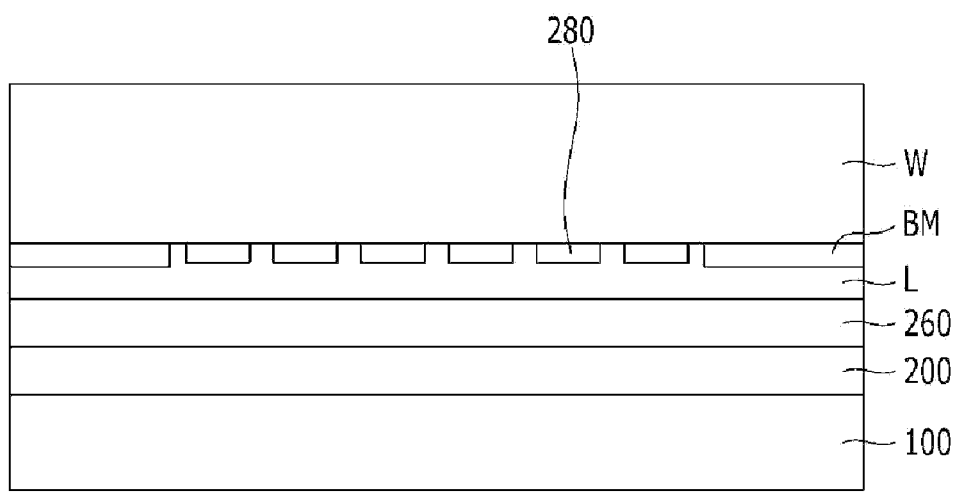

In FIG. 24, the add-on structure is also illustrated, but the touch sensor layer 280 is fabricated by forming and patterning a transparent conductive material on the cover window W, and the touch sensor layer 280 is attached to the anti-static layer 260 formed on the upper panel 200 of the display panel via an adhesive layer L. To prevent a parasitic capacitance between the anti-static layer 260 and the touch sensors of the touch sensor layer 280, the same signal, for example, the sensing scanning signal may be applied to the anti-static layer 260 and the touch sensors of the touch sensor layer 280. It is also noted that a black matrix BM may be formed on the cover window W.

Figure 25:
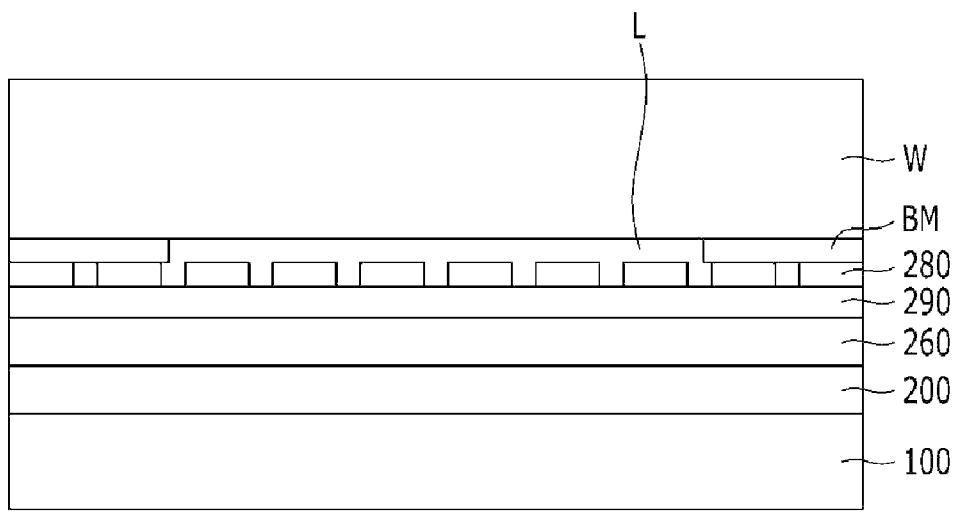

FIG. 25 illustrates an add on-cell structure in which a passivation layer 290 is formed on the anti-static layer 260 and the touch sensor layer 280 is formed on the passivation layer 290 via a patterning process. The cover window W may be attached on the touch sensor layer 280 via the adhesive layer L. A black matrix BM may be formed on the cover window W and between the cover window W and the passivation layer 290. The same signal may be applied to the anti-static layer 260 and the touch sensors of the touch sensor layer 280 to prevent generation of a parasitic capacitance between the anti-static layer 260 and the touch sensors of the touch sensor layer 280.

Figure 26:
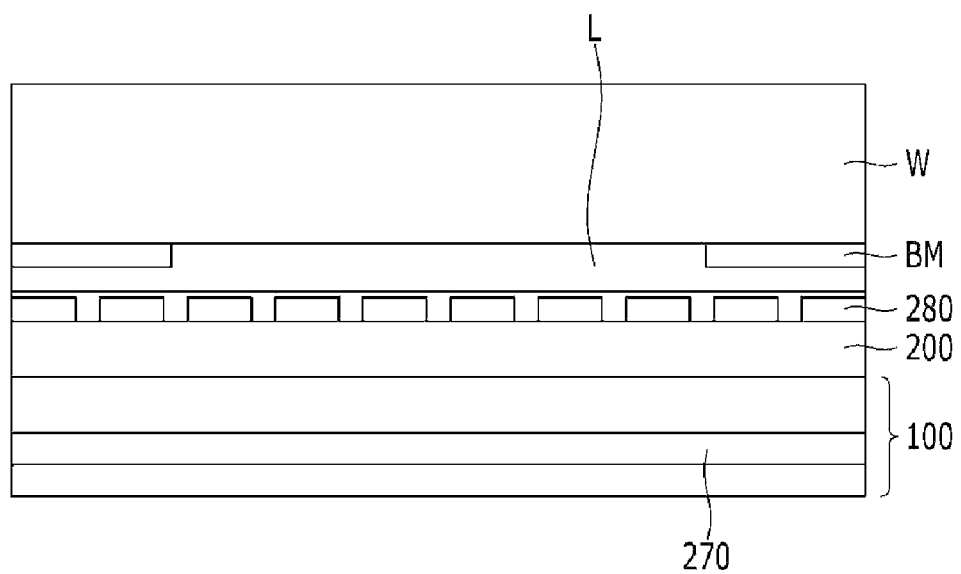

FIG. 26 illustrates a structure in which the touch sensor layer 280 is formed by patterning an anti-static layer formed on the upper panel 200. In this manner, the touch sensor layer 280 may also serve as an anti-static layer. The cover window W may be attached to the touch sensor layer 280 via the adhesive layer L. A black matrix BM may be formed between the cover window W and the touch sensor layer 280. The same signal, for example, a complex signal combining the sensing scanning signal and the common voltage may be applied to the touch sensors of the touch sensor layer 280 and the common electrode 270, which is formed as part of the lower substrate 100.

Figure 27:
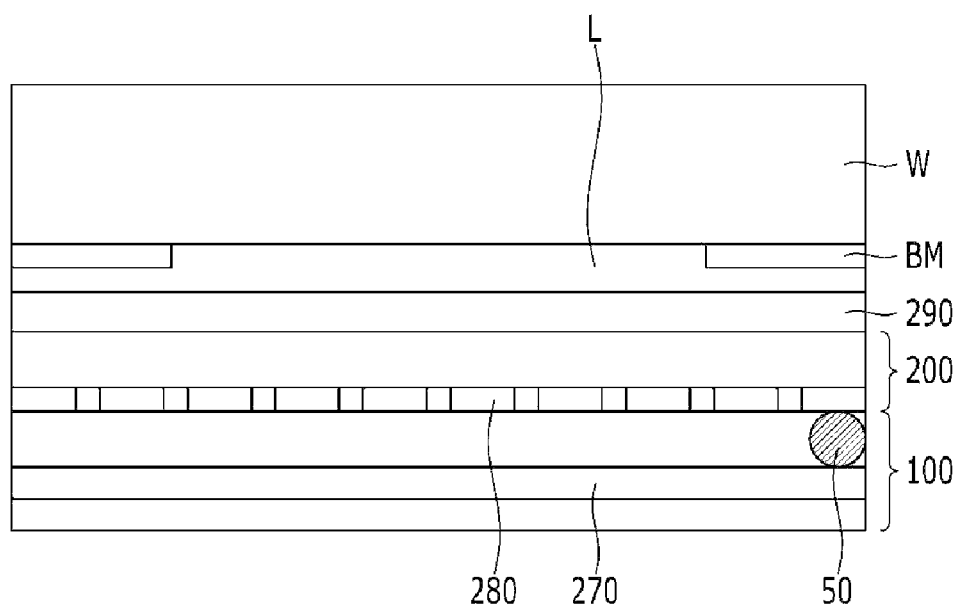

FIG. 27 illustrates a structure in which the touch sensor layer 280 is formed at a side of the upper panel 200 without the thin film transistor. When the touch sensor layer 280 is formed on the upper panel 200 side, since connection with the flexible printed circuit board (FPCB) is difficult, the sensing signal line (not illustrated) of the touch sensor layer 280 may be connected to the lower panel 100 side via one or more conductive dots 50. The same signal, for example, a complex signal combining the sensing scanning signal and the common voltage may be applied to the touch sensors of the touch sensor layer 280 and the common electrode 270, which is formed as part of the lower substrate 100.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
 a display panel comprising:
  pixels configured to display images; and
  touch sensor electrodes configured to sense a touch event, the touch sensor electrodes overlapping a common electrode disposed in a different layer than the touch sensor electrodes, the touch sensor electrodes being spaced apart from the common electrode without any contact between the touch sensor electrodes and the common electrode, the common electrode being configured to apply a common voltage to the pixels;
 a signal controller configured to generate signals to control the display of the images via the display panel;
 sensing signal lines respectively connected to the touch sensor electrodes; and
 a touch sensor controller configured to:
  transmit a sensing input signal via the sensing signal lines;
  receive a sensing output signal via the sensing signals lines; and
  generate touch information based on reception of the sensing output signal,
 wherein the touch sensor controller is configured to apply the same signal to the touch sensor electrodes and the common electrode,
 wherein the display panel further comprises:
  a lower panel; and
  an upper panel disposed on the lower panel, the touch sensor electrodes being configured to sense the touch event on a surface of the upper panel; and
 wherein the lower panel comprises:
  the common electrode;
  an insulating layer disposed on the common electrode; and
  a touch sensor layer comprising the touch sensor electrodes, the touch sensor layer being disposed on the insulating layer, the insulating layer being disposed between the common electrode and the touch sensor layer.

2. The display device of claim 1, wherein:
 the touch sensor controller is further configured to generate a sensing scanning signal; and
 the same signal is a combined signal of the sensing scanning signal and the common voltage.

3. The display device claim 1, wherein:
 the common electrode comprises a first pattern;
 the touch sensor layer comprises a second pattern; and
 the first pattern and the second pattern are substantially the same as one another and substantially overlap one another.

4. The display device of claim 3, wherein:
 the first pattern and the second pattern correspond to cutouts; and
 the cutouts are formed in respective areas of the pixels.

5. The display device of claim 4, wherein the sensing signal lines are disposed between adjacent cutouts.

6. The display device of claim 1, wherein the touch sensor controller is further configured to:
 receive a synchronization signal from the signal controller;
 generate a scanning enable signal based on the synchronization signal; and
 generate a sensing scanning signal based on the scanning enable signal.

7. The display device of claim 6, wherein:
 the synchronization signal is a clock pulse vertical signal and an output enable signal; and
 the touch sensor controller is configured to generate the scanning enable signal using an XNOR gate.

8. The display device of claim 7, wherein the touch sensor controller comprises:
 timing generator configured to generate the scanning enable signal based on the synchronization signal received from the signal controller;
 a signal generate/processing unit configured to:
  generate the sensing scanning signal based on the scanning enable signal; and
  process the sensing output signal;
 a signal transmitting/receiving unit configured to:
  transmit the sensing output signal; and
  receive the sensing output signal; and
 a multiplexer configured to:
  selectively transfer the sensing input signal to the sensing signal lines; and
  receive the sensing output signal.

9. The display device of claim 8, wherein:
 the start pulse vertical signal comprises a display active period and a vertical blanking period; and
 the signal transmitting/receiving unit is configured to transmit the sensing scanning signal during one or more horizontal blanking periods of the display active period and during the vertical blanking period.

10. The display device of claim 8, wherein a high period of the scanning enable signal is disposed between a falling edge of the clock pulse vertical signal and a rising edge of the output enable signal.

11. The display device of claim 10, wherein the duration of the high period is at least 20 to 30 μs.

12. The display device of claim 6, wherein the touch sensor controller is configured to generate the touch information when:
 an amplitude of the sensing output signal is less than the amplitude of the sensing scanning signal; and
 the absolute difference between the amplitude of the sensing output signal and the amplitude of the sensing scanning signal is larger than a threshold value.

13. The display device of claim 1, wherein the touch sensor controller is disposed on a flexible printed circuit board, a glass substrate, or a printed circuit boar.

* * * * *